United States Patent
Roskind et al.

(10) Patent No.: US 9,419,916 B2
(45) Date of Patent: Aug. 16, 2016

(54) NETWORK FALLBACK USING RESOURCE REQUEST EXPECTATIONS

(71) Applicant: Google Inc., Mountain View, CA (US)

(72) Inventors: James Anthony Roskind, Redwood City, CA (US); Ian Douglas Swett, Cambridge, MA (US)

(73) Assignee: Google Inc., Mountain View, CA (US)

(*) Notice: Subject to any disclaimer, the term of this patent is extended or adjusted under 35 U.S.C. 154(b) by 259 days.

(21) Appl. No.: 14/078,443

(22) Filed: Nov. 12, 2013

(65) Prior Publication Data

US 2015/0127811 A1 May 7, 2015

Related U.S. Application Data

(60) Provisional application No. 61/899,109, filed on Nov. 1, 2013.

(51) Int. Cl.
*G06F 15/173* (2006.01)
*H04L 12/923* (2013.01)
*H04L 12/919* (2013.01)

(52) U.S. Cl.
CPC .......... *H04L 47/762* (2013.01); *H04L 47/765* (2013.01)

(58) Field of Classification Search
CPC .................................................. H04L 47/765
USPC ................................................ 709/224, 217
See application file for complete search history.

(56) References Cited

U.S. PATENT DOCUMENTS

| | | | | |
|---|---|---|---|---|
| 6,282,192 B1* | 8/2001 | Murphy | .............. | H04L 12/5692 370/328 |
| 6,760,766 B1* | 7/2004 | Sahlqvist | ................ | H04L 69/16 709/224 |
| 6,868,080 B1* | 3/2005 | Umansky | ............ | H04L 12/5692 370/354 |
| 8,661,119 B1* | 2/2014 | Jindal | .................... | H04L 67/303 709/224 |
| 2003/0172145 A1* | 9/2003 | Nguyen | ................. | G06Q 10/10 709/223 |
| 2004/0153701 A1 | 8/2004 | Pickell | | |
| 2009/0249321 A1* | 10/2009 | Mandyam | ................. | G06F 8/65 717/171 |
| 2010/0008291 A1* | 1/2010 | LeBlanc | ................. | H04L 45/24 370/328 |
| 2012/0230329 A1* | 9/2012 | Morris | .................... | H04L 69/16 370/389 |

FOREIGN PATENT DOCUMENTS

EP   2605606 A2   6/2013

* cited by examiner

*Primary Examiner* — David Lazaro
*Assistant Examiner* — Marie Georges Henry
(74) *Attorney, Agent, or Firm* — McDermott Will & Emery LLP

(57) ABSTRACT

Methods for network fallback using resource request expectations are provided. In one aspect, a method includes receiving a resource request, the resource request including one or more request expectations. The method also includes sending the resource request to a hostname via a first network connection. The method also includes evaluating network activity in response to the sent resource request. The method also includes resending the resource request to the hostname via a second network connection based on the evaluated network activity and the one or more request expectations. Systems and machine-readable media are also provided.

21 Claims, 5 Drawing Sheets

NETWORK FALLBACK USING RESOURCE REQUEST EXPECTATIONS

CROSS-REFERENCE TO RELATED APPLICATIONS

The present application claims the benefit of U.S. Provisional Patent Application Ser. No. 61/899,109, entitled "Network Fallback Using Resource Request Expectations," filed on Nov. 1, 2013, which is hereby incorporated by reference in its entirety for all purposes.

BACKGROUND

The subject technology generally relates to the transmission of data over a network, and more particularly to the connection of a computing device with another computing device.

Many devices, such as mobile phones, laptops, and tablets, have the capability of connecting to the internet via more than one network, such as via a local wireless network or a cellular network. Situations may arise where a device is connected to a network and has established a good connection, but the connection quality may deteriorate. The user experience may also deteriorate as the connection quality deteriorates.

SUMMARY

According to certain aspects of the subject technology, a computer-implemented method for network fallback using resource request expectations. The method includes receiving a resource request, the resource request including one or more request expectations. The method also includes sending the resource request to a hostname via a first network connection. The method also includes evaluating network activity in response to the sent resource request. The method also includes resending the resource request to the hostname via a second network connection based on the evaluated network activity and the one or more request expectations.

According to certain aspects of the subject technology, a system for network fallback using resource request expectations is provided. The system includes a memory storing executable instructions and a processor configured to execute the executable instructions stored in the memory to receive a resource request, the resource request including one or more request expectations. The processor is also configured to parse the resource request to determine the one or more request expectations. The processor is also configured to send the resource request to a hostname via a first network connection. The processor is also configured to evaluate network activity in response to the sent resource request. The processor is also configured to resend the resource request to the hostname via a second network connection based on the evaluated network activity and the one or more request expectations.

According to certain aspects of the subject technology, non-transitory machine-readable medium embodying instructions that, when executed by a machine, cause the machine to perform a method is provided. The method includes receiving a resource request, the resource request including one or more request expectations. The method also includes sending the resource request to a hostname via a WiFi connection. The method also includes evaluating network activity in response to the sent resource request based on the one or more request expectations. The method also includes resending the resource request to the hostname via a cellular network connection based on the evaluated network activity.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects. In the drawings.

DETAILED DESCRIPTION

Figure 1:
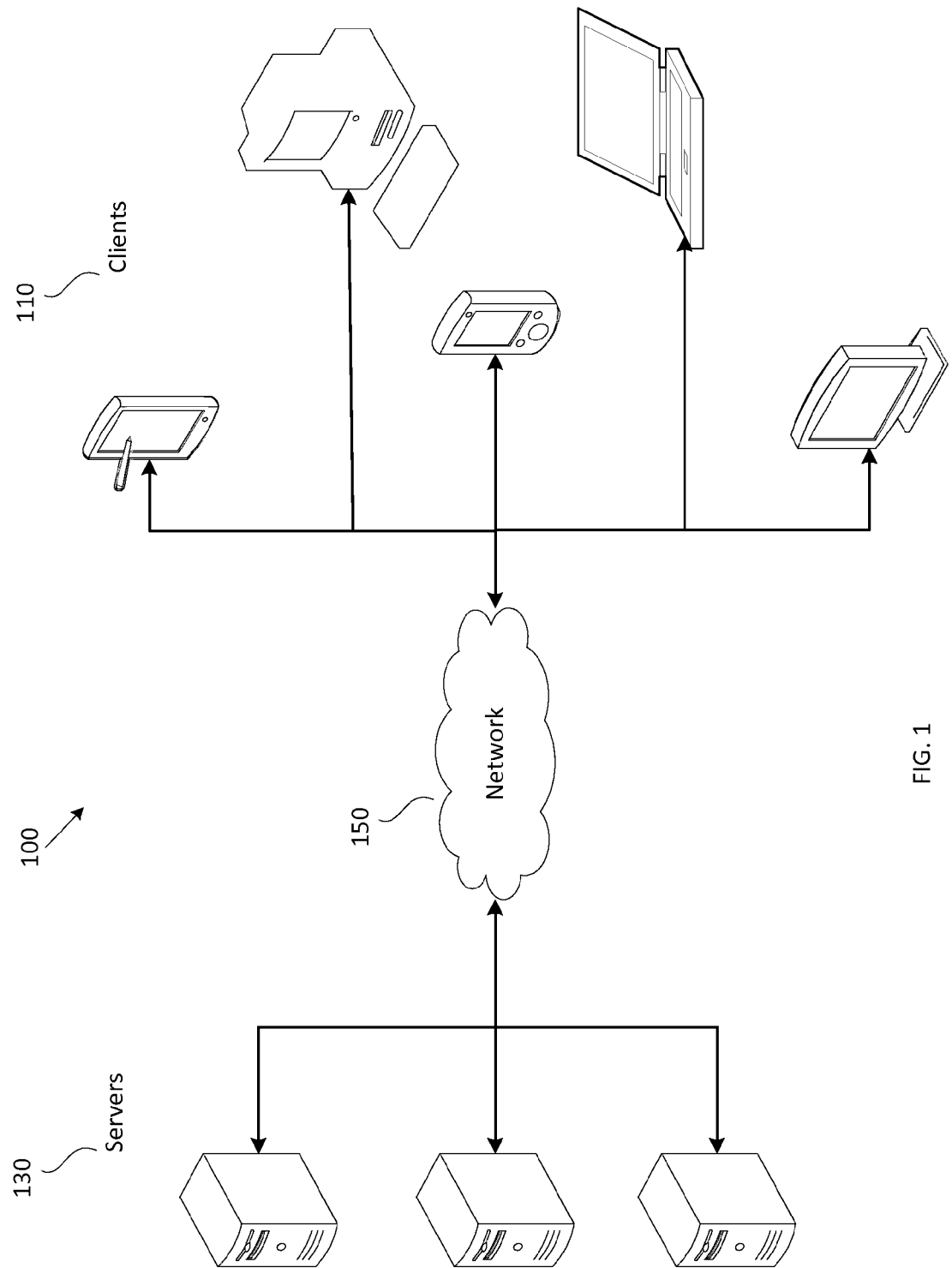
FIG. 1 illustrates an example architecture for network fallback using resource request expectations.

In the following detailed description, numerous specific details are set forth to provide a full understanding of the subject technology. It will be apparent, however, that aspects of the subject technology may be practiced without some of these specific details. In certain instances, well-known structures and techniques have not been shown in detail so as not to obscure the disclosure.

While a device, such as a smartphone or laptop or tablet computer, is connected to the internet, the connection quality may deteriorate. The connection quality may deteriorate because the location of the device may change, there may be interference from another device, or for some other reason, the connection quality becomes unreliable. An example of this experience is if a smartphone is connected to a home WiFi network and the device is then moved to a garage. The smartphone may be at the outer limits of connection to the home WiFi network in the garage. However, because of the distance between the smartphone and the WiFi access point, the internet connection may be very slow. It may even be slow enough to the point that the user would prefer to use an alternative connection, such as cellular network connection, or another WiFi connection. Thus, it is desirable for the device to switch to an alternate network if the connection quality on the current network does not meet certain expectations.

The subject technology receives a resource request including one or more interface expectations. The subject technology sends the resource request to a hostname via a first network connection. The subject technology evaluates network activity in response to the sent resource request based on the one or more interface expectations and resends the resource request to the hostname via a second network connection based on the evaluated network activity and the one or more request expectations.

Expectations may include, but are not limited to: whether the resource request is repeatable, whether the resource request is idempotent, whether the request is urgent, how long the request should take to process, and how much bandwidth the request expected to be present. A resource request is repeatable if it can be repeated without adverse effects. An example of a repeatable resource request is a search request, as executing more than one identical search may not result in adverse effects. An example of a request that may result in adverse effects if repeated is a purchase request, as executing more than one purchase request may result in more than one purchased good.

Expectations may be communicated as part of an anchor tag in an HTML request, as part of an XHR request, or by setting parameters or attributes on a request for results to be obtained from an HTTP request. A computer application informs a requester of an expectation, and the requester may respond in keeping with the expectations to more effectively service the request. This may include retransmitting the request on another interface, or notifying the application (requester) of its inability to meet the current expectations provided in the request.

FIG. 1 illustrates an example architecture 100 for network fallback using resource request expectations. The architecture 100 includes servers 130 and clients 110 connected over a network 150.

Each of the clients 110 is configured to include and execute an application for presenting content. The application can be, for example, a web browser, a video playing program, a document or text editing program, an image editing program, a video editing program, a gaming program, or any other program. The content can be, for example, a web page, a document, an image, a video, an audio file, or a game.

The clients 110 can be, for example, desktop computers, mobile computers, tablet computers (e.g., including e-book readers), mobile devices (e.g., a smartphone or PDA), set top boxes (e.g., for a television), video game consoles, or any other devices having processing, memory, and communications capabilities for presenting content.

The servers 130 can be any device having a processor, memory, and communications capability for hosting the content. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
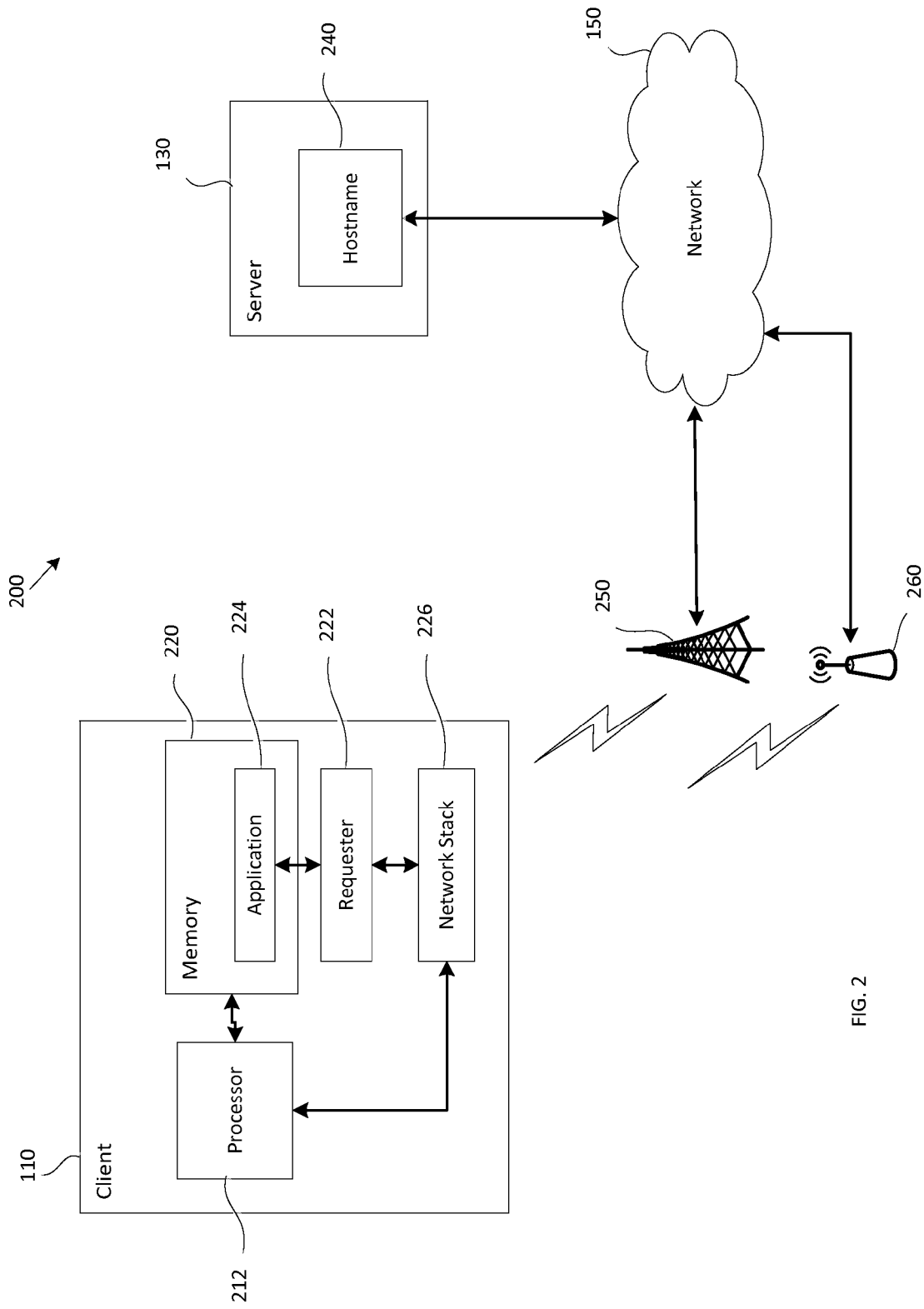
FIG. 2 is a block diagram illustrating an example client and server from the architecture of FIG. 1 according to certain aspects of the disclosure.

FIG. 2 is a block diagram 200 illustrating an example client 110 and server 130 in the architecture 100 of FIG. 1 according to certain aspects of the disclosure. The client 110 may be connected to a cellular network 250. Alternatively, the client 110 may be connected to a WiFi network 260. Both the cellular network 250 and WiFi network 260 are connected to the hostname 240 over the network 150.

In certain aspects, there may be any number of WiFi, cellular network, and local wired network connections available. In certain aspects, there may be one cellular network and one WiFi network available. In certain aspects, there may be one cellular network and two WiFi networks available. In other aspects, there may be no cellular networks available and two WiFi networks available.

The client 110 may include a processor 212, a requester 222, a memory 220 that includes an application 224, and a network stack 226. The processor 212 of the client 110 is configured to execute instructions, such as instructions physically coded into the processor 212, instructions received from software (e.g., application 224) in memory 220, or a combination of both, for network fallback using resource request expectations.

The application 224 can be a web browser, a document or text editing program, an image editing program, a video editing program, a gaming program, or any other program. By way of non-limiting example, the content as discussed herein will be a web page, although other content can be used with the disclosed system, such as a document, an image, a video, an audio file, a game, or other content.

The requester 222 receives a resource request from application 224. The requester 222 may parse the request expectations from the resource request. The requester 222 may also direct the network stack to send the resource request using a first network connection 250. The requester 222 may also evaluate network activity in response to the sent resource request and direct the network stack 226 to resend the resource request using a second network connection 260.

The network stack 226 may interact with the requester 222. The network stack 226 may be responsible for providing the interface between the requester and either the cellular network 250 or WiFi network 260. The network stack 226 may comprise a cellular radio for communication with the cellular network 250. The network stack 226 may also comprise a WiFi radio for communication with the WiFi network 260.

In certain aspects, when the requester 222 receives the resource request, the requester 222 sends the resource request to the hostname 240 via the first network connection 250. The client 110 may evaluate the network activity in response to the sent resource request and resend the resource request to the hostname 240 via the second network connection 260 based on the evaluated network activity and the one or more request expectations.

In certain aspects, the one or more request expectations may include a repeatability indicator. Evaluating network activity comprises determining whether a first timeout has occurred since sending the resource request. The resource request is resent when the first timeout has occurred, based on the repeatability indicator.

In certain aspects, a timeout may be an event designed to occur at the conclusion of a predetermined elapsed time. In certain aspects, a timeout may occur when the client 110 must wait for some event to happen. In certain aspects, the event the client 110 is waiting for may be receiving data from the server 130.

In certain aspects, a repeatability indicator may indicate that the resource request is repeatable if the resource request can be sent multiple times without adverse side effects. For example, a resource request for a search by an internet search engine may not have adverse side effects because the side effects may be limited to logging the request. By comparison, a resource request that is an execution of a purchase order may have adverse side effects if executed more than one time. Therefore, a purchase request may not be a repeatable request. In certain aspects, a resource request that does not include a repeatability indicator in the request expectations may not be resent using the second network connection 260.

For example, if the client 110 sends a resource request of a search to hostname "google.com," the request expectations may include a repeatability indicator. If the client 110 evaluates network activity and determines a timeout has occurred since sending the resource request to "google.com," then the resource request may be resent because the request expectations include a repeatability indicator.

In certain aspects, a repeatability indicator is a tag that is part of an anchor tag of an HTML request. For example, an HTML request <a href="www.google.com/search?query=cats" status=repeatable> contains an anchor tag of "status=repeatable," which may be identified as a repeatability indicator.

In certain aspects, an idempotency indicator may indicate that the resource request is idempotent if repetition of the resource request has effectively the same result each time. For example, a resource request for a search by an internet search engine may have effectively the same result each time. In certain aspects, a resource request that does not include an idempotency indicator in the request expectations may not be resent using the second network connection 260.

For example, if the client 110 sends a resource request of a search to hostname "google.com," the request expectations may include an idempotency indicator. If the client 110 evaluates network activity and determines a timeout has occurred since sending the resource request to "google.com," then the resource request may be resent because the request expectations include an idempotency indicator.

In certain aspects, an idempotency indicator is a tag that is part of an anchor tag of an HTML request. For example, an HTML request <a href="www.google.com/search?query=cats" status=idempotent> contains an anchor tag of "status=idempotent," which may be identified as an idempotency indicator.

In certain aspects, the one or more request expectations may include an urgency indicator. Evaluating network activity comprises determining whether a second timeout has occurred since sending the resource request. The resource request is resent when the second timeout has occurred, based on the repeatability indicator.

In certain aspects, an urgency indicator may indicate that the resource request is urgent if the resource should be delivered to the client 110 as quickly as possible. In certain aspects, an urgency indicator may indicate that the resource request is urgent if the resource should be delivered to the client 110, regardless of the possible cost associated with the delivery of the resource.

For example, the requester 222 may receive a resource request from an application 224. The requester 222 may determine whether there is an urgency indicator in the request expectations of the resource request. The requester 222 may also direct the network stack 226 to send the resource request to the hostname 240 via the first network connection 250. If there is an urgency indicator, the requester 222 then determines whether a timeout has occurred since sending the resource request. If the timeout has occurred, then the requester 222 may direct the network stack to resend the resource request via the second network connection 260 because the request expectations include an urgency indicator.

In certain aspects, the urgency indicator is a tag that is part of an anchor tag of an HTML request. For example, an HTML request <a href="www.google.com/search?query=cats" status=urgent> contains an anchor tag of "status=urgent," which may be identified as an urgency indicator.

In certain aspects, the urgency indicator may be provided by the application 224. In certain aspects, a user may provide the user's urgency preferences to the application 224, and the application 224 may provide the user's urgency preferences as part of the request expectations.

In certain aspects, the one or more request expectations may include an expected processing time associated with the first network connection 250. The client 110 may evaluate network activity by comparing an actual processing time with the expected processing time. If the actual processing time exceeds the expected processing time, the resource request may be resent via the second network connection 260. In certain aspects, the expected processing time comprises an expected time to establish a connection to the hostname via the first network connection. In certain aspects, the expected processing time comprises an expected time until the resource request is acknowledged as having been received. In certain aspects, the expected processing time comprises an expected time until the resource request is first responded to. In other aspects, the expected processing time comprises an expected time until the resource request is completely responded to.

For example, if the one or more request expectations included an expected processing time of 400 ms, the resource request may be resent via the second network connection 260 if the actual processing time via the first network connection 250 is greater than 400 ms.

In certain aspects, the one or more request expectations may include a minimum bandwidth value associated with the first network connection 250. The client 110 may evaluate network activity by comparing the minimum bandwidth value with an actual bandwidth value via the first network connection 250. The actual bandwidth value may be determined by measuring the time required to complete the transfer of a large file from one system to another system and dividing the size of the file and the measured time. If the actual bandwidth value is less than the minimum bandwidth value, the resource request may be resent via the second network connection 260.

For example, if the one or more request expectations included a minimum bandwidth of 500 KB/s, the resource request may be resent via the second network connection if the actual bandwidth via the first network connection 250 is less than 500 KB/s. In this example, the bandwidth may be estimated by various means over time, such as by evaluating the amount of data received in a most recent interval, such as by measuring the bandwidth used during each 100 ms period.

In certain aspects, the client 110 may parse the resource request to determine the one or more request expectations. In certain aspects, the resource request is an HTML request and the HTML request comprises the one or more request expectations.

For example, the resource request may be an HTML request, such as <a href="www.google.com/search?query=cats" status=repeatable,urgent first_response="400 ms" complete_response="1 s" min_bandwidth="500 KB/s">. The client 110 may parse the HTML request and determine that the request expectations present are: a repeatability indicator, an urgency indicator, an expected first response processing time of 400 ms, an expected complete response processing time of 1 s, and a minimum bandwidth value of 500 KB/s.

In certain aspects, the resource request may be an XHR request and the XHR request comprises the one of more request expectations. In certain aspects, the request expectations may be arguments passed to XmlHttpRequest methods, or as attributes set in an instance associated with a request. In other aspects, the request expectations may be part of a C++ language interface, such as by setting parameters or attributes on a request for results to be obtained from an HTTP request.

In certain aspects, a response to either the first resource request, or a retransmission of that request, or a combination of the responses (such as combined byte-ranges from both responses) may be passed back to the requesting application 224.

In certain aspects, the user of the client 110 may inform the requester 222 of preferences. These preferences may include preference for using a particular network connection, preference for using a particular type of network connection, preference associated with cost, preference associated with speed, preference associated with bandwidth, or any other preference associated with making the resource request.

Figure 3A:
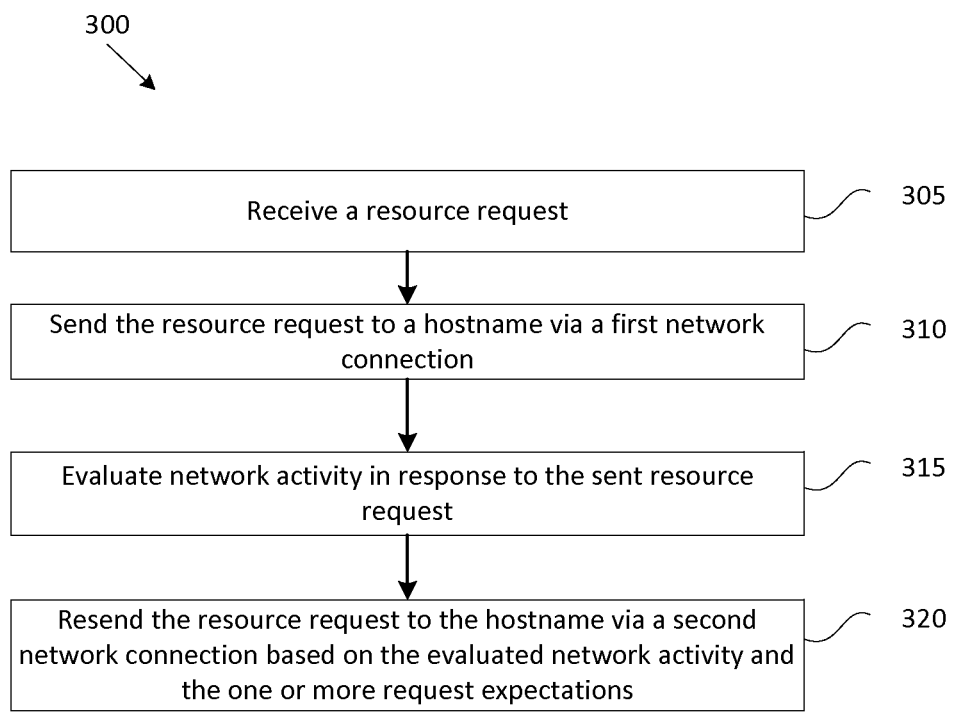
FIG. 3A illustrates an example process for network fallback using resource request expectations using the example client of FIG. 2.

FIG. 3A illustrates an example process for network fallback using resource request expectations using the example client of FIG. 2. While FIG. 3A is described with reference to FIG. 2, it should be noted that the process steps of FIG. 3A may be performed by other systems. In block 305, the requester 222 receives a resource request. In block 310, the requester 222 sends the resource request to a hostname 240 via a first network connection 250. In block 315, the requester 222 evaluates network activity in response to the sent resource request. In block 320, the requester 222 resends the resource request to the hostname 240 via a second network connection 260 based on the evaluated network activity and the one or more request expectations.

In block 305, the requester 222 receives a resource request from the application 224. The application 224 may be prompted to send the requester 222 a resource request when the user of the client 110 selects a link on a webpage. The resource request may include one or more resource expectations. As described above, the resource expectations may be a repeatability indicator, an idempotency indicator, an urgency indicator, an expected processing time, and/or a minimum bandwidth value.

In block 310, the requester 222 directs the network stack 226 to send the resource request to the hostname 240 via the cellular network 250. The network stack 226 uses the cellular radio to connect to the cellular network 250. Once connected to the cellular network 250, the network stack sends the resource request to the hostname 240 over the network 150.

In block 315, the requester 222 evaluates network activity in response to the sent resource request. As described above, evaluating network activity depends on the request expectations. If the request expectations include a repeatability indicator, the requester 222 evaluates network activity by determining whether a timeout has occurred since sending the resource request. If the request expectations include an urgency indicator, the requester 222 evaluates network activity by determining whether a different timeout has occurred since sending the request. If the request expectations include an expected processing time, the requester 222 evaluates network activity by comparing an actual processing time with the expected processing time. If the request expectations include a minimum bandwidth value, the requester 222 evaluates network activity by comparing an actual bandwidth value with the minimum bandwidth value.

Based on the evaluated network activity, the requester 222 may direct the network stack 226 to resend the resource request to the hostname 240 via the WiFi network 260. The network stack 226 may use the WiFi radio to establish a connection to the WiFi network 260 and may resend the resource request to the hostname 240 over the network 150.

Figure 3B:
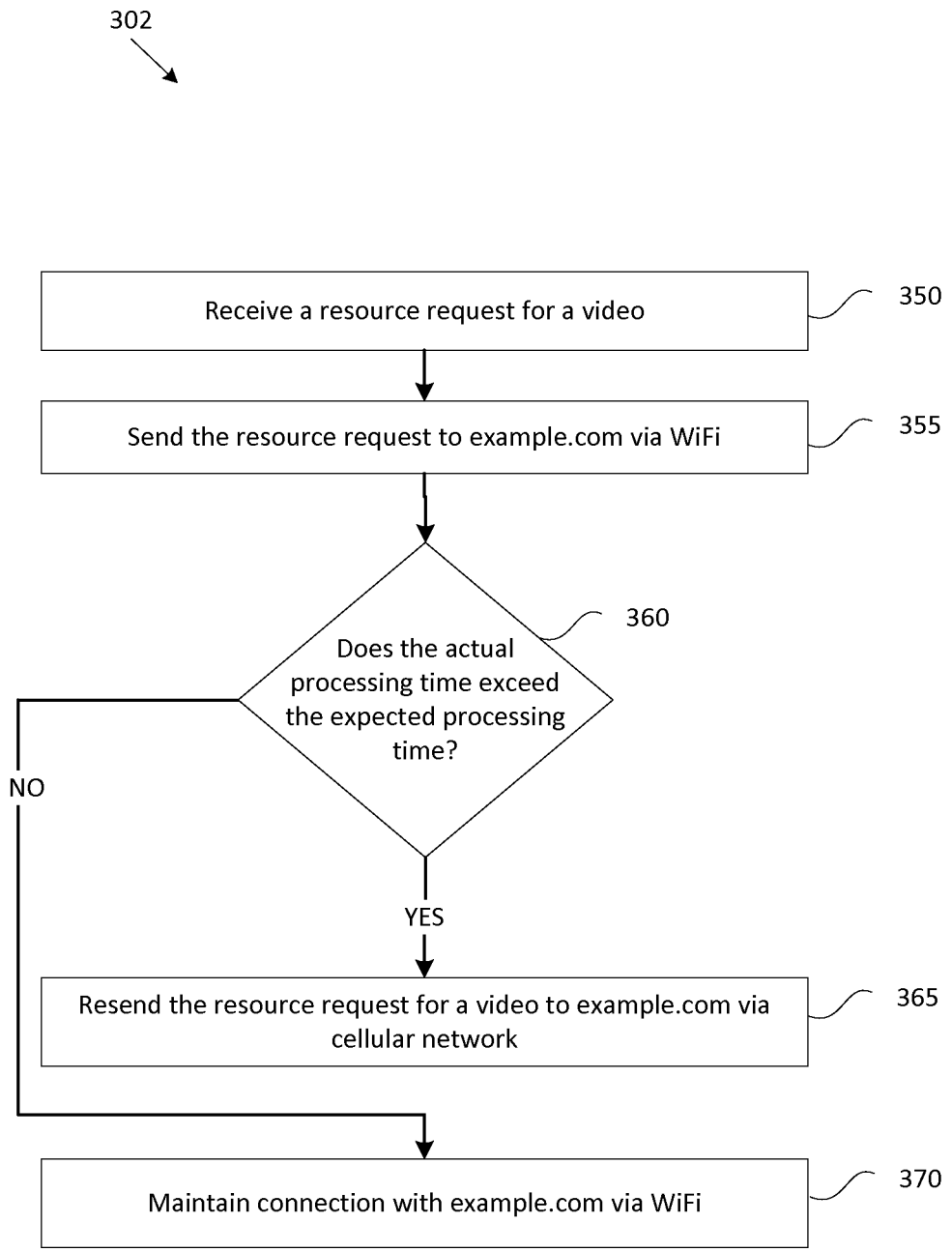
FIG. 3B illustrates an example process for network fallback using resource request expectations using an example.

FIG. 3B illustrates an example process for network fallback using resource request expectations using an example system comprising an application that is a web browser, a client that is a smartphone, a hostname "example.com," a first network connection that is WiFi, a second network connection that is a cellular network connection, and a resource request for a video that includes an expected processing time of "400 ms" in the one or more request expectations.

In block 350, the smartphone receives a resource request for a video. In block 355, the smartphone sends the resource request to "example.com" via WiFi. In decision block 360, it is determined whether the actual processing time exceeds the expected processing time. If the actual processing time exceeds the expected processing time, the process 302 proceeds to block 365, in which the smartphone resends the resource request for a video to "example.com" via the cellular network. If the actual processing time does not exceed the expected processing time, the process 302 proceeds to block 370, in which the smartphone maintains connection with "example.com" via WiFi.

In block 350, a requester of the smartphone receives a video resource request from the web browser. The web browser is prompted to send the requester a resource request when the user of the smartphone selects a link on a webpage for the video.

In block 355, the requester directs the network stack to send the resource request to the "example.com" via the WiFi network. The network stack uses the WiFi radio to connect to the WiFi network. Once connected to the WiFi network, the network stack sends the resource request to "example.com."

In decision block 360, the requester evaluates network activity in response to the sent resource request. Since the request expectations include an expected processing time, the requester evaluates network activity by comparing an actual processing time with the expected processing time of 400 ms. If the actual processing time exceeds the expected processing time of 400 ms, the process 302 proceeds to block 365. If the actual processing time does not exceed the expected processing time of 400 ms, the process 302 proceeds to block 370.

In block 365, the requester directs the network stack to resent the resource request for a video to "example.com" via the cellular network. The network stack uses the cellular radio to connect to the cellular network. Once connected to the cellular network, the network stack sends the resource request to "example.com."

In block 370, the connection with "example.com" using the WiFi network is maintained.

Figure 4:
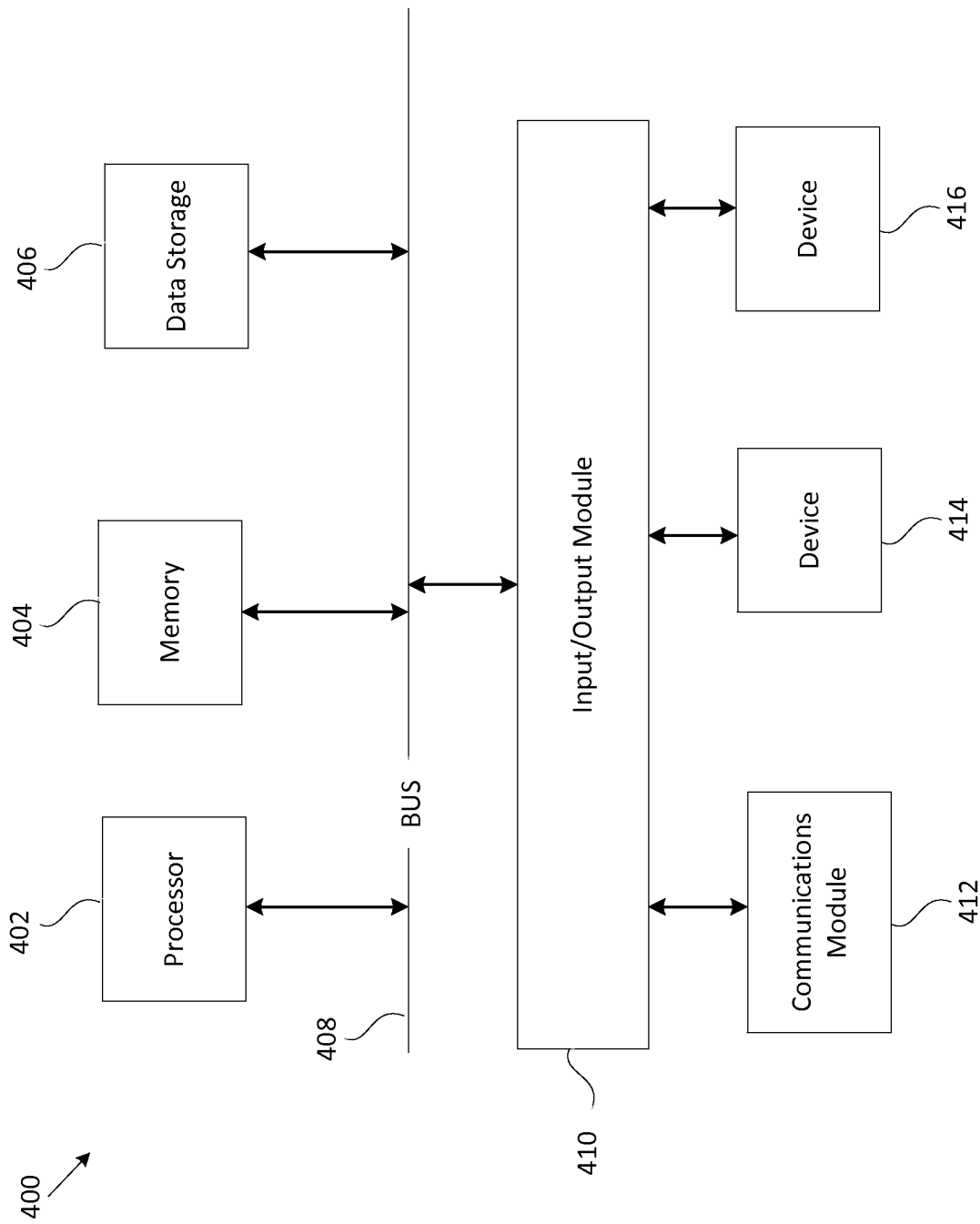
FIG. 4 is a block diagram illustrating an example computer system with which some implementations of the subject technology can be implemented.

FIG. 4 is a block diagram illustrating an example computer system 400 with which some implementations of the subject technology can be implemented. In certain aspects, the computer system 400 may be implemented using hardware or a combination of software and hardware, either in a dedicated server, or integrated into another entity, or distributed across multiple entities.

Computer system 400 (e.g., clients 110 and servers 130) includes a bus 408 or other communication mechanism for communicating information, and a processor 402 (e.g., processor 212) coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404 (e.g., memory 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The instructions may be stored in the memory 404 and implemented in one or more computer program products, i.e., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module. Example input/output modules 410 include data ports such as USB ports. The input/output module 410 is configured to connect to a communications module 412. Example communications modules 412 include networking interface cards, such as Ethernet cards and modems. In certain aspects, the input/output module 410 is configured to connect to a plurality of devices, such as an input device 414 and/or an output device 416. Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 416 include display devices, such as a LED (light emitting diode), CRT (cathode ray tube), or LCD (liquid crystal display) screen, for displaying information to the user.

According to one aspect of the subject technology, the client 110 and server 130 can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the subject technology. Thus, aspects of the subject technology are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 402 for execution. Such a medium may take many forms, including, but not limited to, non-volatile media, volatile media, and transmission media. Non-volatile media include, for example, optical disks, magnetic disks, or flash memory, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. To the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate aspects can also be implemented in combination in a single aspect. Conversely, various features that are described in the context of a single aspect can also be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method comprising:
   receiving, on a first client component of a client device, a resource request from a second client component of the client device, the resource request including one or more request expectations;
   providing for a first transmission of the resource request to a hostname via a first network connection;
   evaluating network activity associated with the first network connection in response to the resource request being transmitted to the hostname;
   providing for a second transmission of the resource request to the hostname via a second network connection based on the evaluated network activity and the one or more request expectations; and
   sending, in response to the second transmission of the resource request, a notification from the first client component to the second client component indicating that a connection quality of the first network connection did not satisfy the one or more request expectations.

2. The method of claim 1, wherein the one or more request expectations include a repeatability indicator,
   wherein evaluating network activity comprises determining whether a first timeout has occurred since sending the resource request, and
   wherein the resource request is resent based on the repeatability indicator when the first timeout has occurred.

3. The method of claim 1, wherein the one or more request expectations include an urgency indicator,
   wherein evaluating network activity comprises determining whether a second timeout has occurred since sending the resource request, and
   wherein the resource request is resent based on the urgency indicator when the second timeout has occurred.

4. The method of claim 1, wherein the one or more request expectations include an expected processing time associated with the first network connection,
   wherein evaluating network activity comprises comparing an actual processing time with the expected processing time, and
   wherein the resource request is resent when the actual processing time exceeds the expected processing time.

5. The method of claim 4, wherein the expected processing time comprises an expected time to establish a connection to the hostname via the first network connection.

6. The method of claim 1, wherein the one or more request expectations includes a minimum bandwidth value, wherein evaluating network activity comprises comparing the minimum bandwidth value with an actual bandwidth value available via the first network connection, and wherein the resource request is resent when the actual bandwidth value is less than the minimum bandwidth value.

7. The method of claim 1, wherein the first network connection is a WiFi connection, and
the second network connection is a cellular network connection.

8. The method of claim 1, wherein the first network connection is a first WiFi connection, and
the second network connection is a second WiFi connection.

9. The method of claim 1, further comprising parsing the resource request to determine the one or more request expectations.

10. The method of claim 9, wherein the resource request is an HTML request, and
wherein the HTML request comprises the one or more request expectations.

11. The method of claim 9, wherein the resource request is an XHR request, and
wherein the XHR request comprises the one or more request expectations.

12. The method of claim 1, wherein the first client component is an application configured to present content to a user and the second client component is an interface configured to process resource requests from the application for transmission to the hostname.

13. A system comprising:
a memory storing executable instructions; and
a processor configured to execute the executable instructions stored in the memory to:
    receive, on a first client component of a client device, a resource request from a second client component of the client device, the resource request including one or more request expectations;
    parse the resource request to determine the one or more request expectations;
    send the resource request to a hostname via a first network connection;
    evaluate network activity associated with the first network connection in response to the resource request being sent to the hostname;
    resend the resource request to the hostname via a second network connection based on the evaluated network activity and the one or more request expectations; and
    sending, in response to resending the resource request, a notification from the first client component to the second client component indicating that a connection quality of the first network connection did not satisfy the one or more request expectations.

14. The system of claim 13, wherein the one or more request expectations include a repeatability indicator,
wherein evaluating network activity comprises determining whether a first timeout has occurred since sending the resource request, and
wherein the resource request is resent based on the repeatability indicator when the first timeout has occurred.

15. The system of claim 13, wherein the one or more request expectations include an urgency indicator,
wherein evaluating network activity comprises determining whether a second timeout has occurred since sending the resource request, and
wherein the resource request is resent based on the urgency indicator when the second timeout has occurred.

16. The system of claim 13, wherein the one or more request expectations include an expected processing time associated with the first network connection,
wherein evaluating network activity comprises comparing an actual processing time with the expected processing time, and
wherein the resource request is resent when the actual processing time exceeds the expected processing time.

17. The system of claim 16, wherein the expected processing time comprises an expected time to establish a connection to the hostname via the first network connection.

18. The system of claim 13, wherein the one or more request expectations includes a minimum bandwidth value,
wherein evaluating network activity comprises comparing the minimum bandwidth value with an actual bandwidth value available via the first network connection, and
wherein the resource request is resent when the actual bandwidth value is less than the minimum bandwidth value.

19. The system of claim 13, wherein the first network connection is a WiFi connection, and
the second network connection is a cellular network connection.

20. The system of claim 13, wherein the resource request is an HTML request, and
wherein the HTML request comprises the one or more request expectations.

21. A non-transitory machine-readable medium embodying instructions that, when executed by a machine, cause the machine to perform a method comprising:
    receiving, on a first client component of a client device, a resource request from a second client component of the client device, the resource request including one or more request expectations;
    sending the resource request to a hostname via a first wireless network connection;
    evaluating network activity associated with the first wireless network connection using the one or more request expectations, in response to the resource request being sent to the hostname;
    resending the resource request to the hostname via a second wireless network connection based on the evaluated network activity; and
    sending, in response to the resending of the resource request, a notification from the first client component to the second client component indicating that a connection quality of the first wireless network connection did not satisfy the one or more request expectations.

* * * * *